United States Patent
Pakulski et al.

(10) Patent No.: US 6,756,345 B2
(45) Date of Patent: Jun. 29, 2004

(54) WELL SERVICE COMPOSITION AND METHOD

(75) Inventors: Marek K. Pakulski, The Woodlands, TX (US); Jeffrey C. Dawson, Spring, TX (US)

(73) Assignee: BJ Services Company, Houston, TX (US)

( * ) Notice: Subject to any disclaimer, the term of this patent is extended or adjusted under 35 U.S.C. 154(b) by 328 days.

(21) Appl. No.: 09/855,412

(22) Filed: May 15, 2001

(65) Prior Publication Data

US 2002/0010101 A1 Jan. 24, 2002

Related U.S. Application Data

(60) Provisional application No. 60/204,153, filed on May 15, 2000.

(51) Int. Cl.[7] .............................. C09K 3/00; E21B 43/26
(52) U.S. Cl. ....................... 507/246; 507/922; 507/229; 507/225; 507/209; 507/211; 507/903; 166/308
(58) Field of Search .............................. 507/246, 209, 507/211, 271, 273, 903, 922, 220, 225, 229; 166/308

(56) References Cited

U.S. PATENT DOCUMENTS

| | | | | |
|---|---|---|---|---|
| 3,987,162 | A | | 10/1976 | Scheuermann ................ 424/70 |
| 4,424,866 | A | * | 1/1984 | McGuire ..................... 166/308 |
| 4,456,067 | A | | 6/1984 | Pinner, Jr. ................ 166/244 C |
| 4,597,779 | A | | 7/1986 | Diaz ............................... 55/32 |
| 4,602,920 | A | | 7/1986 | Diaz et al. ....................... 55/32 |
| 4,678,558 | A | | 7/1987 | Belluteau et al. ........... 208/390 |
| 4,690,219 | A | * | 9/1987 | Burns .......................... 507/922 |
| 4,915,176 | A | | 4/1990 | Sugier et al. ................ 166/371 |
| 4,964,467 | A | * | 10/1990 | Holtmyer et al. ........... 166/308 |
| 4,973,775 | A | | 11/1990 | Sugier et al. ................. 585/15 |
| 5,076,364 | A | | 12/1991 | Hale et al. ................... 166/310 |
| 5,331,105 | A | | 7/1994 | Duncum et al. ............. 585/800 |
| 5,351,756 | A | | 10/1994 | Minkkinen et al. ......... 166/267 |
| 5,426,258 | A | | 6/1995 | Thomas et al. ................ 585/15 |
| 5,432,292 | A | | 7/1995 | Sloan, Jr. ....................... 585/15 |
| 5,460,728 | A | | 10/1995 | Klomp et al. ................ 210/698 |
| 5,491,269 | A | | 2/1996 | Colle et al. .................... 585/15 |
| 5,639,925 | A | | 6/1997 | Sloan, Jr. et al. ............. 585/15 |
| 5,713,416 | A | * | 2/1998 | Chatterji et al. ............ 166/308 |
| 5,741,758 | A | | 4/1998 | Pakulski ....................... 507/90 |
| 5,827,804 | A | * | 10/1998 | Harris et al. ................ 507/209 |
| 5,874,385 | A | * | 2/1999 | Mzik et al. .................. 507/211 |
| 5,874,660 | A | | 2/1999 | Colle et al. .................... 585/15 |
| 5,880,319 | A | | 3/1999 | Sloan, Jr. ....................... 585/15 |
| 6,025,302 | A | | 2/2000 | Pakulski ....................... 507/90 |
| 6,148,911 | A | * | 11/2000 | Gipson et al. ............... 166/248 |
| 6,165,947 | A | * | 12/2000 | Chang et al. ................ 166/308 |
| 6,177,929 | B1 | | 1/2001 | Maddalozzo, Jr. et al. . 345/326 |

FOREIGN PATENT DOCUMENTS

| | | | | |
|---|---|---|---|---|
| EP | 0 594 363 A1 | 10/1993 | ............. | C08L/5/14 |
| EP | 0 805 260 A2 | 5/1997 | ............. | E21B/43/26 |
| EP | 0 916 806 A2 | 5/1999 | ............. | E21B/43/26 |
| EP | 0 962 626 A2 | 9/1999 | ............. | E21B/43/25 |
| WO | WO 96/41785 | 12/1996 | ............. | C07C/7/20 |
| WO | WO 97/13824 | 4/1997 | ............. | C10B/43/08 |

* cited by examiner

*Primary Examiner*—Philip C. Tucker
(74) *Attorney, Agent, or Firm*—Howery Simon Arnold & White, LLP

(57) ABSTRACT

A well service fluid composition comprises a fracturing fluid and a gas hydrate inhibitor. Preferably, the gas hydrate inhibitor does not affect the function of the fracturing fluid and is present in an amount sufficient to control and/or minimize the formation of gas hydrates. The well service fluid composition is useful in hydraulic fracturing in which the composition is injected into a subterranean formation under sufficient pressure to initiate and propagate a fracture in the formation. The fracturing fluid may be subsequently recovered when the fracturing operation is completed.

29 Claims, 1 Drawing Sheet

WELL SERVICE COMPOSITION AND METHOD

CROSS REFERENCE TO RELATED APPLICATIONS

This application claims priority to a prior U.S. Provisional patent application, Serial No. 60/204,153, filed May 15, 2000, entitled Well Stimulation Composition and Method.

FEDERALLY SPONSORED RESEARCH

Not applicable.

REFERENCE TO MICROFICHE APPENDIX

Not applicable.

FIELD OF THE INVENTION

The embodiments of the invention relates to compositions and methods for use in well service and, more particularly, to fracturing fluids and a method of using same.

BACKGROUND OF THE INVENTION

A common practice in the recovery of oil and/or gas from subterranean formations is to treat the formations to increase their gross permeability or conductivity by procedures that are identified generally as fracturing processes. For example, it is a conventional practice to hydraulically fracture an oil or gas well in order to produce and propagate one or more cracks or "fractures" in the surrounding formation by mechanical breakdown of the formation.

Hydraulic fracturing typically is accomplished by injecting a hydraulic fracturing fluid into the well and imposing sufficient pressure on the fracturing fluid to cause the formation to break down with the attendant production of one or more fractures. The fracturing fluid is usually a gel, an emulsion, or a form having a proppant such as sand or other particulate material suspended therein. The proppant is deposited into the fracture and functions to hold the fracture open after the pressure is released and the fracturing fluid is recovered from the well.

After the fracturing fluid has been pumped into the formation and fracturing of the formation has been achieved, it is desirable to remove the fluid from the formation to allow hydrocarbon production through the new fractures. Generally, the removal of the fracturing fluid, which is highly viscous, is realized by "breaking" the gel, emulsion, etc., i.e., by converting the fracturing fluid into a low viscosity fluid.

As oil and gas exploration and production moves into progressively deeper offshore waters, greater challenges are being presented. For example, it is known that gas hydrates pose particular problems with respect to the producing, transporting, and processing of natural gas and petroleum fluids. These gas hydrates, known as clathrate hydrates, are crystalline compounds that form when water forms a cage-like structure around gas molecules, particularly gaseous molecules. Typical gas hydrates formed in petroleum environments are composed of water and one or more gas molecules such as methane, ethane, propane, isobutane, normal butane, nitrogen, carbon dioxide, hydrogen sulfide, etc.

While gas hydrate formation may pose a significant problem during production from a well, it may also pose a problem in a fracturing operation. As noted above, once the fracturing operation has been completed, the fracturing liquid has to be recovered or unloaded before the well commences producing hydrocarbons. In the unloading process, the fracturing fluid is frequently saturated with one or more of the gases mentioned above, which undergo decompression, resulting Joule-Thompson cooling of the fracturing fluid. Accordingly, when the fracturing fluid is water-based, gas hydrates may form at certain well depths, plugging the well and interfering with the process of bringing the well onstream. Therefore, there is a need for a well service composition and method for controlling or minimizing the formation of gas hydrates.

SUMMARY OF THE INVENTION

The above need is met by embodiments of the invention in one or more of the following aspects. In one aspect, the invention relates to a well service composition comprising a fracturing fluid and a gas hydrate controller. The gas hydrate controller is in an amount effective to control the formation of gas hydrates. The gas hydrate controller may include, but is not limited to, polyglycolpolyamines used alone or in combination with one or more polymers capable of controlling or minimizing the formation of gas hydrates. Additional aspects of the invention relate to methods of making and using the composition. Characteristics and advantages provided by embodiments of the invention become apparent with the following description.

DESCRIPTION OF EMBODIMENTS OF THE INVENTION

Figure 1:
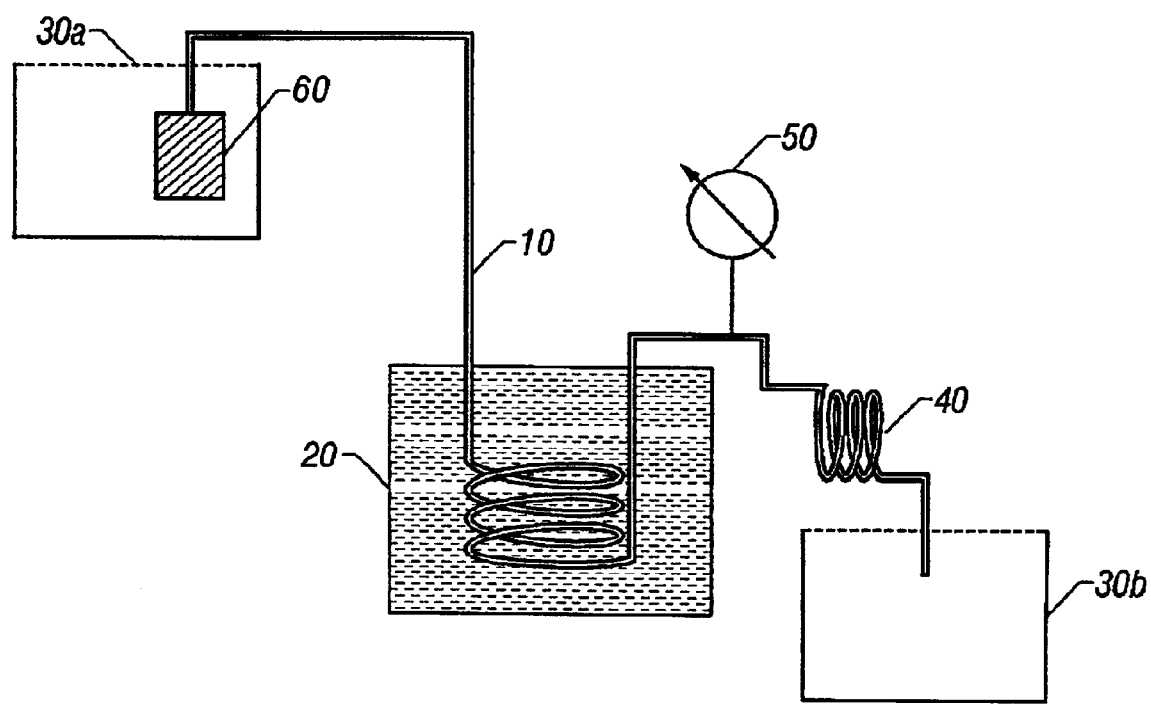
FIG. 1 is a schematic representation of the testing apparatus used.

Embodiments of the invention provide a well service composition and methods of making and using the composition. The well service composition comprises a fracturing fluid and a gas hydrate inhibitor. Preferably, the gas hydrate inhibitor should be present in an effective amount to control and/or minimize the formation of gas hydrates.

The term "fracturing fluid" is intended to encompass any water-based fluid that can be used in oil and gas reservoirs for stimulation, i.e., to enhance oil and/or gas from the reservoir. Fracturing fluids useful in embodiments of the invention comprises at least a carrier fluid, usually an aqueous liquid, and a viscosifying polymer.

Suitable water-containing fracturing fluids of embodiments of the invention comprises of water-soluable or dispersible polymers or polymeric-type materials, such as surfactants that form micelles and significantly increase the viscosity of the carrier fluid, including polysaccharides such as galactomannan gums, glucomannan gums, and their derivatives. Solvatable galactomannan and glucomannan gums are naturally occurring. The galactomannan gums can also be reacted with hydrophilic constituents and thereby produce derivatized polymers useful in embodiments of the invention. Solvatable polysaccharides with molecular weights of greater than about 200,000 are preferred. More preferred solvatable polysaccharides have molecular weights in the range of from about 200,000 to about 3,000,000. Non-limiting examples of such polysaccharides include, but are not limited to, guar gum, locust bean gum, karaya gum, xanthan gum, and guar derivatives such as carboxymethyl guar, carboxyethyl guar, hydroxypropyl guar, hydroxyethyl guar, and carboxymethylhydroxypropyl guar. Cellulose derivatives such as hydroxypropyl cellulose, carboxymethyl cellulose, carboxymethylhydroxypropyl cellulose, hydroxyethyl cellulose and carboxymethylhydroxyethyl cellulose are also useful in embodiments of the invention. Additional solvatable polymers may also include sulfated or sulfonated guars, cationic guars derivatized with agents such as 3-chloro-2-hydroxypropyl trimethylammonium chloride, and synthetic polymers with anionic groups, such as polyvinyl acetate, polyacrylamides, poly-2-amino-2-methyl propane sulfonic acid, and various other synthetic polymers and copolymers. Moreover, U.S. Pat. No. 5,566,760 discloses a class of hydrophobically modified polymers for use in fracturing fluids. These hydrophobically modified polymers may be used in embodiments of the invention with or without modification. The disclosure of the patent is incorporated by reference herein in its entirety. Other suitable polymers include those known or unknown in the art.

The polymer may be present in the fluid in concentrations ranging from about 0.05% to about 5.0% by weight of the aqueous fluid. A preferred range for the solvatable polymer is about 0.20% to about 0.80% by weight. In some embodiments, about 20 lbs. or less of a polymer is mixed with 1000 gal. of an aqueous fluid. For example, about 5, 10, or 15 lbs. of a polymer may be mixed with 1000 gal. of an aqueous fluid. Under certain circumstances, it is more advantageous to have reduced polymer loading (i.e., a polymer concentration of 0.14 wt. % or less or 20 ppt or less). This is because less damage would occur to a formation if a reduced level of polymers is used in a fracturing fluid. An additional benefit of reduced polymer loading may be increased fracture conductivity. Although it may be beneficial to employ polymers at a reduced level, a fracturing fluid may be formulated at a higher polymer level. For example, about 20 lbs. or higher of a polymer may be mixed with 1000 gal. of an aqueous fluid. Specifically, about 25 lbs., 30 lbs., 35 lbs., 40 lbs., 45 lbs., 50 lbs., 55 lbs., or 60 lbs. of a polymer may be mixed with 1000 gal. of an aqueous fluid. In some embodiments, about 65 lbs. or more of a polymer may be mixed with 1000 gal. of an aqueous fluid As disclosed in *Reservoir Stimulation*, $2^{nd}$ Edition (Prentice Hall), Chapter 4: "Fracturing Fluid Chemistry," Janet Gulbis, and Chapter 7: "Fracturing Fluids and Additives," John W. Ely, incorporated herein by reference for all purposes, a number of additives, in addition to the carrier liquid, viscosifying agent, and proppant, can be incorporated into the fracturing fluids of embodiments of the invention. For example, additives such as crosslinking agents, biocides, breakers, buffers, surfactants and non-emulsifiers, fluorocarbon surfactants, clay stabilizers, fluid loss additives, foamers, friction reducers, temperature stabilizers, diverting agents, etc., can be incorporated into the fracturing fluids of embodiments of the invention.

A suitable crosslinking agent can be any compound that increases the viscosity of the fluid by chemical crosslinking, physical crosslinking, or any other mechanisms. For example, the gellation of a solvatable polymer can be achieved by crosslinking the polymer with metal ions including aluminum, antimony, zirconium, and titanium containing compounds. One class of suitable crosslinking agents is organotitanates. Another class of suitable crosslinking agents is borates as described, for example, in U.S. Pat. No. 4,514,309, or organoborates as described, for example, in U.S. Pat. No. 5,145,590, which are incorporated by reference herein in their entirety. The selection of an appropriate crosslinking agent depends upon the type of treatment to be performed and the solvatable polymer to be used. The amount of the crosslinking agent used also depends upon the well conditions and the type of treatment to be effected, but is generally in the range of from about 0.01 to about 1.0 parts by weight of crosslinking agent per 100 parts by weight of the aqueous fluid. In some applications, the aqueous polymer solution is crosslinked immediately upon addition of the crosslinking agent to form a highly viscous gel. In other applications, the reaction of the crosslinking agent can be retarded so that viscous gel formation does not occur until the desired time.

A suitable borate cross-linking agent may be used in any amount to effect the cross-linking and, thus, to increase the viscosity of a fracturing fluid. The concentration of a borate cross-linking agent generally is dependent upon factors such as the temperature and the amount of the polymer used in a fracturing fluid. Normally, the concentration may range from about 5 ppm to about 100 ppm, preferably from about 10 ppm to about 70 ppm. A borate cross-linking agent may be used in any form, such as powder, solution, or granule. Encapsulated borates may also be used. Encapsulated borate may be prepared by providing a hydrocarbon-based enclosure member which envelopes a breaking agent. Encapsulation may be accomplished by the method described in U.S. Pat. No. 4,919,209, which is incorporated by reference herein in its entirety. A delayed cross-linking system may also be used in embodiments of the invention. U.S. Pat. Nos. 5,160,643, 5,372,732, and 6,060,436 disclose various delayed borate cross-linking system that can be used in embodiments of the invention. The disclosures of the preceding patents are incorporated by reference in their entirety herein. Additional suitable borate cross-linking agents are disclosed in the following U.S. Pat. Nos. 4,619,776; 5,082,579, 5,145,590, 5,372,732; 5,614,475; 5,681,796; 6,060,436; and 6,177,385, all of which are (or have been) incorporated by reference herein in their entirety.

The pH of an aqueous fluid which contains a solvatable polymer can be adjusted if necessary to render the fluid compatible with a crosslinking agent. Preferably, a pH adjusting material is added to the aqueous fluid after the addition of the polymer to the aqueous fluid. Typical materials for adjusting the pH are commonly used acids, acid buffers, and mixtures of acids and bases. For example, hydrochloric acid, fumaric acid, sodium bicarbonate, sodium diacetate, potassium carbonate, sodium hydroxide, potassium hydroxide, and sodium carbonate are typical pH adjusting agents. Acceptable pH values for the fluid may range from acidic, neutral, to basic, i.e., from about 0.5 to about 14. Preferably, the pH is kept neutral or basic, i.e., from about 7 to about 14, more preferably between about 8 to about 12. Other pH ranges include, but are not limited to, between about 9 to about 11, between about 7 to about 11, between about 7 to about 12, between about 5 to about 9, between about 3 to about 10 or between about 6 to about 9. It is also possible to use a fracturing fluid with a pH outside the above ranges. In some embodiments, a fracturing fluid may have an initial pH of less than about 7.5, such as about 3.5, about 5, or about 5.5. The pH may then be increased to above 7.5, such as between about 8.5 to about 11. After the treatment, the pH may be decreased to less than about 7.5. Therefore, a fracturing fluid may be acidic, neutral, or basic, depending on how it is used in well treatments.

The fracturing fluid in accordance with embodiments of the invention may include a breaking agent or a breaker. The term "breaking agent" or "breaker" refers to any chemical that is capable of reducing the viscosity of a gelled fluid. As described above, after a fracturing fluid is formed and pumped into a subterranean formation, it is generally desirable to convert the highly viscous gel to a lower viscosity fluid. This allows the fluid to be easily and effectively removed from the formation and to allow desired material, such as oil or gas, to flow into the well bore. This reduction in viscosity of the treating fluid is commonly referred to as "breaking". Consequently, the chemicals used to break the viscosity of the fluid is referred to as a breaking agent or a breaker.

There are various methods available for breaking a fracturing fluid or a treating fluid. Typically, fluids break after the passage of time and/or prolonged exposure to high temperatures. However, it is desirable to be able to predict and control the breaking within relatively narrow limits. Mild oxidizing agents are useful as breakers when a fluid is used in a relatively high temperature formation, although formation temperatures of 300° F. or higher will generally break the fluid relatively quickly without the aid of an oxidizing agent.

Both organic oxidizing agents and inorganic oxidizing agents have been used as breaking agents. Any breaking agent or breaker, both inorganic and organic, may be used in embodiments of the invention. Examples of organic breaking agents include, but are not limited to, organic peroxides, and the like.

Examples of inorganic breaking agents include, but are not limited to, persulfates, percarbonates, perborates, peroxides, chlorites, hypochlorites, oxides, perphosphates, permanganates, etc. Specific examples of inorganic breaking agents include, but are not limited to, ammonium persulfates, alkali metal persulfates, alkali metal percarbonates, alkali metal perborates, alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate, alkali metal chlorites, alkali metal hypochlorites, $KBrO_3$, $KClO_3$, $KIO_3$, sodium persulfate, potassium persulfate, and so on. Additional suitable breaking agents are disclosed in U.S. Pat. Nos. 5,877,127; 5,649,596; 5,669,447; 5,624,886; 5,106,518; 6,162,766; and 5,807,812. The disclosures of all of the preceding patents are incorporated by reference herein in their entirety.

In addition, enzymatic breakers may also be used in place of or in addition to a non-enzymatic breaker. Examples of suitable enzymatic breakers are disclosed, for example, in U.S. Pat. Nos. 5,806,597 and 5,067,566, which are incorporated by reference herein in their entirety. A breaking agent or breaker may be used as is or be encapsulated and activated by a variety of mechanisms including crushing by formation closure or dissolution by formation fluids. Such techniques are disclosed, for example, in U.S. Pat. Nos. 4,506,734; 4,741,401; 5,110,486; and 3,163,219, which are incorporated by reference herein in their entirety. In some embodiments, an inorganic breaking agent is selected from alkaline earth metal or transition metal-based oxidizing agents, such as magnesium peroxides, zinc peroxides, and calcium peroxides. Other suitable breakers include the ester compounds disclosed in U.S. Provisional Patent Application Serial No. 60/260,442, filed on Jan. 9, 2001, the disclosure of which is incorporated by reference herein in its entirety.

As described above, propping agents or proppants may be added to the fracturing fluid, which is typically done prior to the addition of a crosslinking agent. However, proppants may be introduced in any manner which achieves the desired result. Any proppant may be used in embodiments of the invention. Examples of suitable proppants include, but are not limited to, quartz sand grains, glass and ceramic beads, walnut shell fragments, aluminum pellets, nylon pellets, and the like. Proppants are typically used in concentrations between about 1 to 8 lbs. per gallon of a fracturing fluid, although higher or lower concentrations may also be used as desired. The fracturing fluid may also contain other additives, such as surfactants, corrosion inhibitors, mutual solvents, stabilizers, paraffin inhibitors, tracers to monitor fluid flow back, etc.

The fracturing fluids of used in embodiments of the invention can be single-phase or multi-phase and, in the latter case, can comprise emulsion fracturing fluids and foam-based fluids.

The well service compositions in accordance with embodiments of the invention, in addition to containing a fracturing fluid as discussed above, also contain a gas hydrate controller. The terms "gas hydrate controller" and "gas hydrate inhibitor" as used herein refer to a chemical or composition of matter that retards the formation of gas hydrate crystals and/or retards the agglomeration of gas hydrate crystals if they do not form. Preferably, the gas hydrate inhibitor does not substantially adversely affect the fracturing fluid and remains active after the fracturing fluid has been broken and the fracturing fluid is recovered in the unloading process.

Non-limiting examples of suitable gas hydrate inhibitors include, but are not limited to, compositions such as polymers, including homopolymers and copolymers of monomers such as N, N-dialkylaminoethylmethacrylates, N-vinyl-N-alkyl amides, and N-vinyl lactams. A generic structure of a N-methyl-N-vinylacetamide (VIMA)/lactam copolymer, also useful in embodiments of the invention, is depicted as follows:

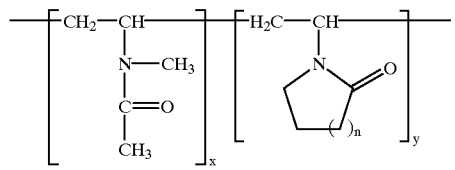

where n ranges from one to three and the sum of x and y is an average number sufficient to produce an average molecular weight between about 1,000 to about 6,000,000.

Compounds belonging to the group of polymers and copolymers of N-acyl substituted polyalkeneimines, and mixtures thereof, are very effective inhibitors of hydrate nucleation, growth, and/or agglomeration (collectively referred to as hydrate formation). This group includes polymers derived from 2-alkyl-2-oxazolines, 2-alkyl-2-oxazines and other cyclic imino ethers. A generic structure for these polymers is depicted as follows:

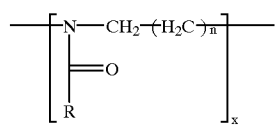

where R is hydrogen or an alkyl, aryl, alkylaryl, cycloalkyl, or heterocyclic group such that the resultant polymer is substantially water soluble, n ranges from one to four and x is an average integer sufficient to produce an average molecular weight between about 1,000 to about 1,000,000.

Other gas hydrate inhibitors include, but are not limited to, polyglycolpolyamines, which are polycondensation products of the reaction of one or more polyamines with one or more, polyoxyalkylene glycol derivatives. The polyoxyalkylene glycol derivatives may be represented as follows:

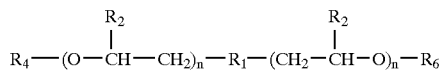

wherein $R_1$ is a member selected from the group consisting of oxygen, glyceryloxy, lower alkylene dicarboxyloxy and lower aklylene diisocyano; $R_2$ is a member selected from the group consisting of hydrogen, methyl and ethyl; $R_4$ and $R_6$ individually are selected from the group consisting of halo-, -hydroxyl-lower alkyl, -epoxy-lower alkyl, and α-sulfato-lower alkyl; and n is an integer from 2 to 35.

The polyamines have the formula:

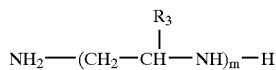

wherein $R_3$ is a member selected from the group consisting of hydrogen and methyl and m is an integer from 1 to 3.

The polyoxyalkylene glycol derivatives and the polyamines are reacted in a molar ratio of about 1:0.8 to about 1:1.5, preferably about 1:1.05 to about 1:1.2 at a temperature of from about 75 C. to about 160 C. to produce polyglycol polyamines represented by the following structure:

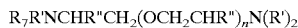

wherein $R_7$ is H, $CH_3$, or—$[R'NCHR''CH_2(OCH_2CHR'')_n NR']_m$—R', R' is H or $CH_3$, R'' is H or $CH_3$, n is 1 to 99 and m is 0 to 99. Additional suitable gas hydrate controllers are also disclosed in U.S. Pat. Nos. 6,025,302; 5,741,758, 5,460,728, 5,432,292, 5,426,258; 5,491,269, 5,351,756, 5,331,105; 5,076,364; 4,973,775; 4,915,176; 4,678,558; 4,602,920; 4,597,779; 4,456,067, and references cited therein, all of which are incorporated herein by reference for all purposes. It should be understood that a mixture of various gas hydrate inhibitors can be employed. Thus, polyglycolpolyamines can be mixed with certain polymeric inhibitors to provide a system that not only retards the formation of gas hydrate crystals but retards the clustering or agglomeration of such crystals should they form.

The following U.S. Patents further disclose various polymers for retarding the formation of gas hydrate crystals and/or retarding the agglomeration of gas hydrate crystals if they are already formed which may be employed in embodiments of the invention with or without modifications: U.S. Pat. Nos. 6,117,929; 5,880,319; 5,874,660; 5,639,925; 5,491,269 and 3,987,162. All of the preceding patents are incorporated by reference herein in their entirety.

In formulating a well service composition, the gas hydrate inhibitor can be added to the fracturing fluid prior to the fluid being pumped into the formation. Alternatively, it is possible to inject the gas hydrate inhibitor into a formation into which the fracturing has already been introduced.

The amount of gas hydrate inhibitor present in a well service composition can vary over a wide range, depending on numerous factors, such as the nature of the fracturing fluid, the water content of the fracturing fluid, temperature and pressure conditions in the well, and other such factors. Thus, knowing such parameters, an effective amount of the gas hydrate inhibitor or controller can be easily determined and added to a given fracturing fluid. Generally, the gas hydrate inhibitor may be present in the composition in an amount of from about 0.01 to about 5% by weight, preferably from about 0.05 to about 1% by weight of the water present in composition, more particularly in an amount of from about 0.03 to about 0.75% by weight of the water present in the composition.

As described above, a fracturing fluid may include a number of components. Table I below exemplifies some acceptable compositional ranges for the fluid. It should be understood that compositions outside the indicated ranges are also within the scope of the invention.

TABLE I

Exemplary Composition Ranges*

| Component | Suitable Range (wt %) | Other Suitable Range (wt %) | Still Other Suitable Range (wt %) |
|---|---|---|---|
| Polymer | 0.1–5.0 | 0.14–1.0 | 0.2–0.8 |
| Crosslinking Agent | 0.001–5.0 | 0.005–2.0 | 0.01–1.0 |
| Breaking Agent | 0.001–1.0 | 0.005–0.5 | 0.01–0.12 |
| Proppant | 3–300 | 6–180 | 12–96 |
| pH Buffer | 2–14 | 3–13 | 8–12 |
| Gas Hydrate Inhibitor | 0.01–5 | 0.05–1 | 0.03–0.75 |

*note:
each weight percentage is based on the total weight of the solvent (e.g., water).

The fracturing fluid in accordance with embodiments of the invention has many useful applications. For example, it may be used in hydraulic fracturing, gravel packing operations, water blocking, temporary plugs for purposes of wellbore isolation and/or fluid loss control, and other well completion operations. One application of the fracturing fluid is in hydraulic fracturing. In use, the well service composition, as described above, is injected into a subterranean formation to be fractured. Sufficient pressure is applied on the formation for a sufficient period of time to fracture the formation and propagate the fracture. Following fracturing, and if necessary, the fracturing fluid is broken with a suitable breaker, following which the pressure on the formation is released, the fracturing fluid is then recovered.

Accordingly, embodiments of the invention provide a method of stimulating a subterranean formation. The method includes: (a) formulating a fracturing fluid comprising an aqueous fluid, a water-soluble polymer, and a gas hydrate controller capable of controlling or minimizing the formation of gas hydrates; and (b) injecting the fracturing fluid into a bore hole to contact at least a portion of the formation by the fracturing fluid under a sufficient pressure to fracture the formation. Under some circumstances, the initial viscosity of the fracturing fluid should be maintained above at least 200 cP at 40 $sec^{-1}$ during injection and, afterwards, should be reduced to less than 200 cP at 40 $sec^{-1}$. After the viscosity of the fracturing fluid is lowered to an acceptable level, at least a portion of the fracturing fluid is removed from the formation. During the fracturing process, a proppant can be injected into the formation simultaneously with the fracturing fluid. Preferably, the fracturing fluid has a pH around or above about 7, more preferably in the range of about 8 to about 12.

It should be understood that the above-described method is only one way to carry out embodiments of the invention. Other suitably methods are described in U.S. Pat. Nos. 6,135,205; 6,123,394; 6,016,871; 5,755,286; 5,722,490; 5,711,396; 5,551,516; 5,497,831; 5,488,083; 5,482,116; 5,472,049; 5,411,091; 5,402,846; 5,392,195; 5,363,919; 5,228,510; 5,074,359; 5,024,276; 5,005,645; 4,938,286; 4,926,940; 4,892,147; 4,869,322; 4,852,650; 4,848,468; 4,846,277; 4,830,106; 4,817,717; 4,779,680; 4,479,041;

4,739,834; 4,724,905; 4,718,490; 4,714,115; 4,705,113; 4,660,643; 4,657,081; 4,623,021; 4,549,608; 4,541,935; 4,378,845; 4,067,389; 4,007,792; 3,965,982; and 3,933,205. All of the preceding patents are incorporated by reference herein in their entirety.

The following examples are presented to illustrate an embodiments of the invention. None of the examples is intended, nor should they be construed, to limit the invention as otherwise described and claimed herein. All numerical values are approximate. Numerical ranges, if given, are merely exemplary. Embodiments outside the given numerical ranges may nevertheless fall within the scope of the invention as claimed.

Testing Procedure

A gas hydrate simulation test was applied for testing the efficiency of gas hydrate inhibitors. The test apparatus is shown in FIG. 1 and comprises a length of coiled tubing 10, a cooling bath 20, and a plurality of fluid reservoirs 30. The coiled tubing 10 consisted of a 20 m long 1 mm ID piece of stainless steel tubing. The coiled tubing 10 was immersed into the cooling bath 20. The cooling bath 20 was filled with an ethylene glycol/water mixture. An end section 40 of the coiled tubing 10 was placed outside the cooling bath 20 and after a pressure gauge/recorder 50. The end section 40 consisted of a short (1 m) 0.05 mm ID stainless steel tubing which emptied into the fluid reservoir 30b. This end section 40 reduced the fluid flow to 2.4 ml/h at a constant feeding pressure 0.1 atm. In each experiment the test solution was pumped from the fluid reservoir 30a through the simulated pipeline (coiled tubing 10 and end section 40) at preset temperatures of −13 to −20° C. The fracturing fluid was formulated in water as follows:

- 3.5% (wt/vol) sodium chloride
- 0.48% (wt/vol) guar gum
- 0.20% (vol) 45% aq. Ptassium carbonate
- 0.05% (vol) gas hydrate inhibitor hydrochloric acid to adjust pH to 10
- 0.20% (vol) boron additive defined in U.S. Pat. No. 5,082,579
- 0.10% (vol) concentrated liquid enzyme, galactomanose (gel breaker)

Each fracturing fluid described above was left for 24 hours at room temperature in the fluid reservoir 30a to allow the enzyme breaker to digest the guar polymer and to convert the highly viscous gel to non-viscous fluid. The broken fracturing gel (can be also called fracturing return fluid) was filtered through a filter 60. The filter 60 was a 10 micron filter. The filtration step was necessary to remove any solid polymer residues from the fluid. The solids would interfere with the testing process. The test fluid was prepared by adding tetrahydrofuran (THF) (20%) to the broken and filtered fracturing gel. It has been published and proved that the THF/salt water solution stimulates gas/water systems without the necessity of running tests at high pressures with highly flammable gas. (See Couch, D. W. Davidson, *Can J. Chem.*, 49, 2961 (1971)).

The test fluid was tested in the coiled tubing 10. The volume of fluid inside the coiled tubing 10 was 60 ml and allowed a 25 hr fluid residence time inside the cooling bath 20 at a flow volume of 0.04 ml/min. The flow volume through the simulated gas pipeline was monitored and recorded with time. The filter 60 located at the coiled tubing 10 intake assured that a flow stop did not occur from plugging the line with impurities, and was caused only by blockage with hydrate crystals being formed in the simulated gas line cooled inside the cooling bath 20. The coiled tubing 10 was warmed up to 60° C. and washed with water and the next test fluid after completion of each test.

In each experiment the fluid flow time was measured from the beginning of flow until the stoppage of flow as a result of complete coil plugging. Due to the test variability the freeze times shown in Table II are the average of five runs each. Longest runs at lowest temperatures indicate best hydrate protection. The results are shown in Table II below.

TABLE II

Flow Times of Broken Borate Fracturing Fluid with Various Gas Hydrate Inhibitors through Simulated Test Pipeline at Various Temperatures

| | Flow Time Hours @ Test Temperature, ° C. | | | | | | | | | |
|---|---|---|---|---|---|---|---|---|---|---|
| Sample | −13 | −14 | −15.5 | −16 | −16.25 | −17.25 | −17.5 | −18.5 | −19.25 | −19.5 |
| 1[1] | >24 h | 24 h | 13 h | 10 h | 8 h | 1.5 h | 1 h | | | |
| 2[2] | | | | >24 h | 16 h | 4 h | 2.3 h | | | |
| 3[3] | | | 24 h | >24 h | >24 h | >24 h | 3.6 h | 1 h | 0.4 h | |
| 4[4] | | | | | >24 h | >24 h | 20 h | 1.5 h | 0.5 h | 0.25 h |

[1] No gas hydrate inhibitor present.
[2] Gas hydrate inhibitor was 0.5% (wt/vol) poly[oxy(methyl 1,2-ethanediyl)], alpha-(2-aminomethylethyl)omega-(2-aminoethylethoxy).
[3] Gas hydrate inhibitor was 0.25% (wt/vol) of polyvinylcaprolactam and 0.25% (wt/vol) of quaternized polyglycolpolyamine gas hydrate inhibitor as defined in U.S. Pat. No. 6,025,302.
[4] Gas hydrate inhibitor was 0.25% (wt/vol) of polyvinylcaprolactam and 0.25% (wt/vol) of polyglycoldiamine described in Footnote 3.

As the results in Table II show, there is an improvement of hydrate inhibition in fluids treated with gas hydrate inhibitors. Particularly, fluids treated with mixed gas hydrate inhibitors like polymer/polyetherpolyamine or polymer/quaternized polyetherpolyamine displayed the best performance.

As demonstrated above, embodiments of the invention provide a well service composition and a method of using the well service composition. The well service composition in accordance with some embodiments of the invention controls or minimizes the formation of gas hydrates the use of a gas hydrate inhibitor. When gas hydrate inhibitors are used, a production well can be brought onstream with no plugging. Additional characteristics and advantages provided by embodiments of the invention are apparent to those skilled in the art.

While the invention has described with respect to a limited number of embodiments, these embodiments are not intended to limit the scope of the invention as otherwise described and claimed herein. Variations and modifications from the described embodiments exist. For example, while polyglycolpolyamines are exemplified as suitable gas hydrate inhibitors, other types of inhibitors may also be used. Although a borate cross-linking agent is exemplified as a preferred cross-linking agent, this does not preclude the use of other types of cross-linking agents, such as antimony-based cross-linking agents. Similarly, although guar polymers are exemplified as preferred polymers in formulating a fracturing fluid, this does not preclude the use of other types of polymers, both synthetic and natural. Generally, it is more economical to employ an aqueous fluid to form a fracturing fluid, this does not preclude a non-aqueous fluid being formulated and used in accordance with embodiments of the invention. In cases where water is no longer the predominant component of a fracturing fluid, a hydratable or water-soluble polymer may not be necessary. Instead, other polymers such as water insoluble polymers, may be used. In describing the method of making and using the fracturing fluid, various steps are disclosed. These steps may be practiced in any order or sequence unless otherwise specified. Moreover, one or more steps may be combined into one single step. Conversely, one step may be practiced in two or more sub-steps. Whenever a number is disclosed herein, it should be interpreted to mean "about" or "approximate," regardless of whether these terms are used in describing the number. The appended claims intend to cover all such variations and modifications as falling within the scope of the invention.

What is claimed is:

1. A method of servicing a subterranean formation comprising:
injecting a gas hydrate controller comprising a polyglycolpolyamine into a borehole that has been treated with a fracturing fluid.

2. The method of claim 1, wherein the gas hydrate controller further comprises a polymer capable of controlling or minimizing the formation of gas hydrates.

3. The method of claim 2, wherein the polymer is a homopolymer or copolymer of N,N-dialkylaminoethylmethacrylates or a mixture thereof.

4. The method of claim 2, wherein the polymer is a homopolymer or copolymer of N-vinyl-N-alkyl amides or a mixture thereof.

5. The method of claim 2, wherein the polymer is a homopolymer or copolymer of N-vinyl lactams or a mixture thereof.

6. The method of claim 2, wherein the polymer is a homopolymer or copolymer of N-methyl-N-vinylacetamide/lactams or a mixture thereof.

7. The method of claim 2, wherein the polymer is a homopolymer or copolymer of N-acyl substituted polyalkeneimines or a mixture thereof.

8. The method of claim 2, wherein the polymer is a homopolymer or a copolymer of N,N-dialkylaminoethylmethacrylates, N-vinyl-N-alkyl amides, and N-vinyl lactams, N-methyl-N-vinylacetamide/lactam copolymer, an N-acyl substituted polyalkeneimines or a mixture thereof.

9. The method of claim 1, wherein the polyglycolpolyamine is a polycondensation product of a reaction between a polyoxyalkylene glycol and a polyamine, or a mixture thereof.

10. The method of claim 1, wherein the polyglycolpolyamine has the structure:

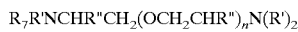

wherein $R_7$ is H, $CH_3$, or —[R'NCHR"$CH_2$(O$CH_2$CHR")$_n$NR']$_m$—R';
wherein R' is H or $CH_3$;
wherein R" is H or $CH_3$;
wherein n is 2 to 99; and
wherein m is 0 to 99.

11. A well service composition comprising:
a fracturing fluid; and
a gas hydrate controller, wherein:
the gas hydrate controller is a polyglycolpolyamine; and
the gas hydrate controller is in an amount effective to control the formation of gas hydrates.

12. The composition of claim 11, wherein the polyglycolpolyamine has the structure:

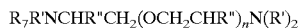

wherein $R_7$ is H, $CH_3$, or —[R'NCHR'$CH_2$(O$CH_2$CHR")$_n$NR']$_m$—R';
wherein R' is H or $CH_3$;
wherein R" is H or $CH_3$;
wherein n is 2 to 99; and
wherein m is 0 to 99.

13. The composition of claim 11, wherein the gas hydrate controller further comprises a second polymer capable of controlling or minimizing the formation of gas hydrates.

14. The composition of claim 13, wherein the second polymer is a homopolymer or copolymer of N,N-dialkylaminoethylmethacrylates or a mixture thereof.

15. The composition of claim 13, wherein the second polymer is a homopolymer or copolymer of N-vinyl-N-alkyl amides or a mixture thereof.

16. The composition of claim 13, wherein the second polymer is a homopolymer or copolymer of N-vinyl lactams or a mixture thereof.

17. The composition of claim 13, wherein the second polymer is a homopolymer or copolymer of N-methyl-N-vinylacetamide/lactams or a mixture thereof.

18. The composition of claim 13, wherein the second polymer is a homopolymer or copolymer of N-acyl substituted polyalkeneimines or a mixture thereof.

19. The composition of claim 11, wherein the polyglycolpolyamine is a polycondensation product of a reaction between a polyoxyalkylene glycol and a polyamine.

20. A method of servicing a subterranean formation comprising injecting a gas hydrate controller comprising a polyglycolpolyamine into a borehole that has been treated with a fracturing fluid, wherein the fracturing fluid is a water-based fluid.

21. The method of claim 20, wherein the gas hydrate controller is from about 0.01 to about 5% by weight of the water in the fracturing fluid.

22. The method of claim 20, wherein the gas hydrate controller is from about 0.05 to about 1% by weight of the water in the fracturing fluid.

23. The method of claim 20, wherein the gas hydrate controller is from about 0.03 to about 0.75% by weight of the water in the fracturing fluid.

24. A method of stimulating a subterranean formation, the method comprising:
preparing a fracturing fluid comprising an aqueous fluid, a water-soluble polymer, and a polyglycolpolyamine; and
injecting the fracturing fluid into a bore hole to contact the subterranean formation.

25. The method of claim 24, wherein the polyglycolpolyamine is a polycondensation product of a reaction between a polyoxyalkylene glycol and a polyamine, or a mixture thereof.

26. The method of claim 24, wherein the polyglycolpolyamine has the structure:

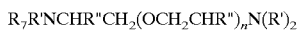

wherein $R_7$ is H, $CH_3$, or —[R'NCHR"CH$_2$(OCH$_2$CHR")$_n$NR']$_m$—R';

wherein R' is H or $CH_3$;

wherein R" is H or $CH_3$;

wherein n is 2 to 99; and wherein m is 0 to 99.

27. The method of claim 24, wherein the polyglycolpolyamine is from about 0.01 to about 5% by weight of the aqueous fluid.

28. The method of claim 24, wherein the polyglycolpolyamine is from about 0.05 to about 1% by weight of the aqueous fluid.

29. The method of claim 24, wherein the polyglycolpolyamine is from about 0.03 to about 0.75% by weight of the aqueous fluid.

* * * * *